United States Patent
Toda et al.

(10) Patent No.: US 12,474,480 B2
(45) Date of Patent: Nov. 18, 2025

(54) INFORMATION PROCESSING DEVICE, BEHAVIOR ANALYSIS SYSTEM, BEHAVIOR ANALYSIS METHOD, AND STORAGE MEDIUM

(71) Applicant: CASIO COMPUTER CO., LTD., Tokyo (JP)

(72) Inventors: Naoto Toda, Tokyo (JP); Ryuji Shingyoji, Tokyo (JP); Nobuyoshi Nishizaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 538 days.

(21) Appl. No.: 17/911,982

(22) PCT Filed: Feb. 3, 2021

(86) PCT No.: PCT/JP2021/003838
§ 371 (c)(1),
(2) Date: Sep. 15, 2022

(87) PCT Pub. No.: WO2021/186930
PCT Pub. Date: Sep. 23, 2021

(65) Prior Publication Data
US 2023/0184960 A1 Jun. 15, 2023

(30) Foreign Application Priority Data
Mar. 19, 2020 (JP) .................... 2020-048694

(51) Int. Cl.
*G01S 19/25* (2010.01)
(52) U.S. Cl.
CPC ................. *G01S 19/258* (2013.01)

(58) Field of Classification Search
None
See application file for complete search history.

(56) References Cited

U.S. PATENT DOCUMENTS

| | | | |
|---|---|---|---|
| 7,142,157 B2 | 11/2006 | Garin et al. | |
| 2014/0011540 A1 | 1/2014 | Miyake | |
| 2014/0292564 A1* | 10/2014 | Park | H04W 4/029 342/357.2 |

FOREIGN PATENT DOCUMENTS

| | | |
|---|---|---|
| JP | 2009267886 A | 11/2009 |
| JP | 2014013204 A | 1/2014 |

(Continued)

OTHER PUBLICATIONS

JP2009267886 translation (Year: 2009).*

(Continued)

*Primary Examiner* — Whitney Moore
(74) *Attorney, Agent, or Firm* — Holtz, Holtz & Volek PC

(57) ABSTRACT

A sensor device includes at least one processor configured to execute processing including: communicating with a user terminal serving as a communication device, acquiring a current position by using prediction ephemeris, acquiring the prediction ephemeris from the user terminal, storing position information indicating the current position acquired, repeating, at intervals, acquiring communication device position information indicating the position of the user terminal and updating the position information based on the communication device position information, and shortening the interval for acquiring the communication device position information when a discrepancy, between the communication device position information and the stored position information prior to being updated is larger than a prescribed reference.

19 Claims, 9 Drawing Sheets

(56) References Cited

FOREIGN PATENT DOCUMENTS

JP         2015190851 A      11/2015
JP         2016072887 A       5/2016

OTHER PUBLICATIONS

International Search Report (ISR) (and English language translation thereof) dated Mar. 16, 2021, issued in International Application No. PCT/JP2021/003838.
Japanese Office Action dated Mar. 16, 2021 (and English translation thereof) issued in counterpart Japanese Application No. 2020-048694.
Japanese Office Action dated Oct. 26, 2021 (and English translation thereof) issued in counterpart Japanese Application No. 2020-048694.
Written Opinion dated Mar. 16, 2021, issued in International Application No. PCT/JP2021/003838.
Extended European Search Report (EESR) dated Jul. 12, 2023, issued in counterpart European Application No. 21772597.7.

* cited by examiner

INFORMATION PROCESSING DEVICE, BEHAVIOR ANALYSIS SYSTEM, BEHAVIOR ANALYSIS METHOD, AND STORAGE MEDIUM

TECHNICAL FIELD

The present invention relates to an information processing device, a behavior analysis system, a behavior analysis method, and a storage medium that use a prediction ephemeris.

BACKGROUND ART

Conventionally, there is known a technique for performing positioning using a prediction ephemeris acquired from a server rather than a satellite. Patent Document 1 discloses such a type of technique. Patent Document 1 discloses a technique for providing a prediction ephemeris predicted by a server to a positioning device, which is a client.

Patent Document 1: U.S. Pat. No. 7,142,157

DISCLOSURE OF THE INVENTION

Problems to be Solved by the Invention

However, according to the technique disclosed in Patent Document 1, when a user moves a long distance after acquiring a prediction ephemeris, a discrepancy between a current position retained by the positioning device and an actual position of the user increases, and positioning using the prediction ephemeris may not function efficiently. For example, in a satellite-searching process, which is a preprocess of positioning processing, a satellite is captured based on a satellite orbit according to a prediction ephemeris and the current position of the information processing device. For this reason, if the current position deviates significantly from the actual position, it takes a long time to capture the satellite.

The present invention has been made in view of such circumstances, and an object thereof is to provide an information processing device, a behavior analysis system, a behavior analysis method, and a storage medium that can accurately acquire position information for efficiently utilizing a prediction ephemeris acquired from an external device.

Means for Solving the Problems

In order to achieve the object described above, an aspect of the present invention provides an information processing device including: at least one processor that executes a program stored in a memory; and storage that stores position information, wherein the processor is configured to execute processing including communicating with a communication device configured to download a prediction ephemeris from an external device; acquiring a current position using the prediction ephemeris; instructing the communication device to download the prediction ephemeris from the external device through communication; acquiring the prediction ephemeris from the communication device; storing position information indicating the current position in the storage; repeating, at intervals, acquiring communication device position information indicating a position of the communication device from the communication device and updating the position information based on the communication device position information; and in a case where a discrepancy between the position information stored in the storage, not yet updated, and the communication device position information is larger than a predetermined reference, making next and subsequent intervals at which the communication device position information is acquired shorter than a current interval.

According to the present invention, it is possible to provide an information processing device, a behavior analysis system, a behavior analysis method, and a storage medium that can accurately acquire position information for efficiently utilizing a prediction ephemeris acquired from an external device.

PREFERRED MODE FOR CARRYING OUT THE INVENTION

Hereinafter, an embodiment of the present invention will be described with reference to the drawings.

Figure 1:
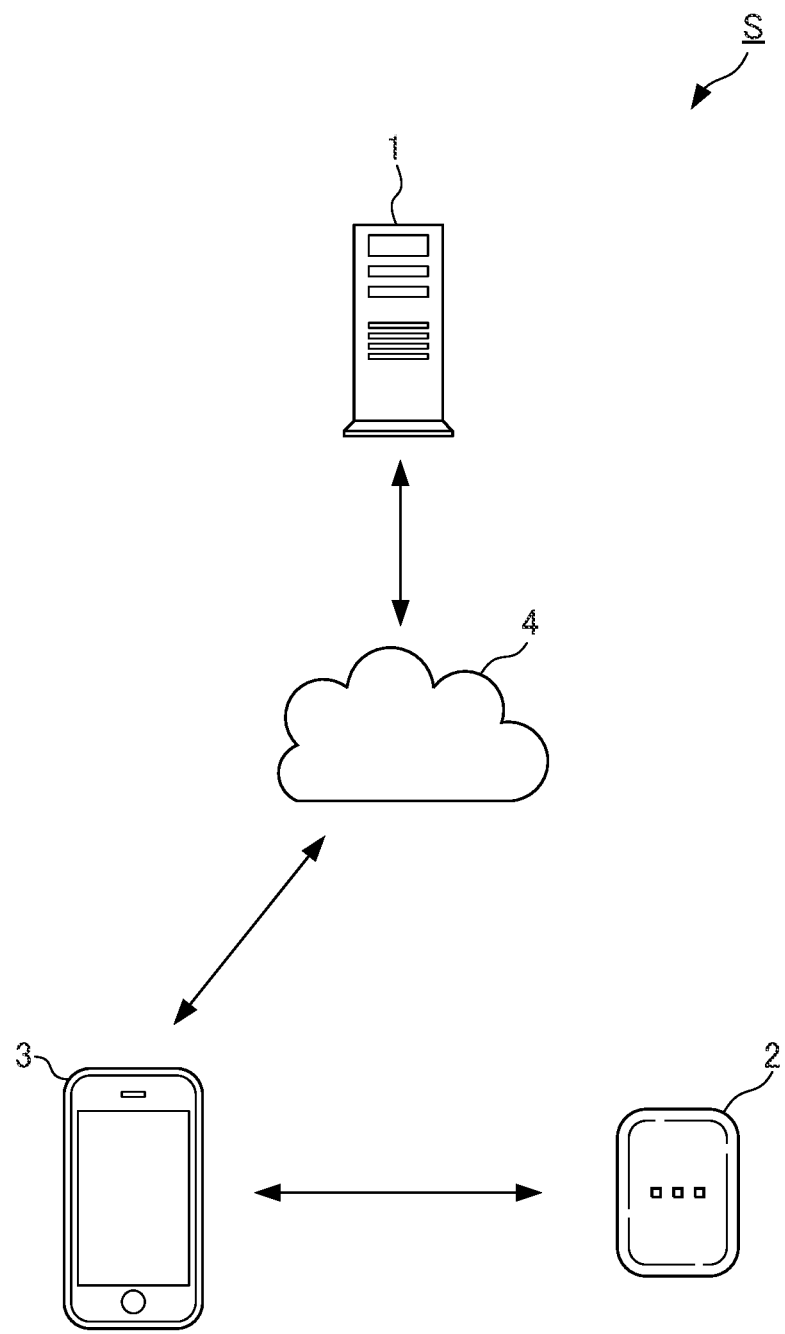
FIG. 1 is a system configuration diagram showing a configuration of a behavior analysis system according to an embodiment of the present invention.

FIG. 1 is a system configuration diagram showing a configuration of a behavior analysis system S according to an embodiment of the present invention. As shown in FIG. 1, the behavior analysis system S includes a management server 1, a sensor device 2, and a user terminal 3.

The management server 1 and the user terminal 3 can communicate with each other. The communication between the management server 1 and the user terminal 3 is realized by, for example, any one of the Internet, a LAN (Local Area Network), and a mobile phone network, or a network 4 that is formed by a combination thereof. Further, the user terminal 3 and the sensor device 2 can also communicate with each other. The communication between the user terminal 3 and the sensor device 2 is performed by, for example, BLE (Bluetooth (registered trademark) Low Energy). A communication method is an example, and the communication between the management server 1 and the user terminal 3 and the communication between the user terminal 3 and the sensor device 2 may use other communication methods.

The management server 1 is a management device having an arithmetic processing function and a communication function. The management server 1 is realized by, for example, a server device or an electronic device such as a personal computer. The management server 1 of the present embodiment executes processing for transmitting positioning satellite information used in GNSS (GLOBAL Navigation Satellite System) to the user terminal 3. As the GNSS, for example, GPS, GLONASS, Galileo, quasi-zenith satellites, or the like are used.

The positioning satellite information includes, for example, an actual ephemeris indicating information on a satellite orbit and a prediction ephemeris. In the following embodiment, a case will be described in which a prediction ephemeris is used as the positioning satellite information. In the management server 1, the prediction ephemeris is updated in a predetermined time zone of a coordinated universal time (UTC). For example, the prediction ephemeris retained by the management server 1 is updated during an update time zone from 0:00 to 1:00. The prediction ephemeris is converted into text data, for example, and transmitted from the management server 1 to the user terminal 3. A prediction ephemeris for a predetermined number of days (for example, three days) is generated in the user terminal 3 by the data transmitted from the management server 1. When a download request of the prediction ephemeris generated in the user terminal 3 is performed during a predetermined update time zone, the management server 1 transmits to the user terminal 3 an error indicating that the prediction ephemeris cannot be properly acquired.

The sensor device 2 is an information processing device that acquires physical information or the like of a user when the user is exercising. The sensor device 2 of the present embodiment has, for example, a sensing function of sensing, as physical information of the user, a walking/running pitch, a stride, a posture, and a waist inclination or the like of the user when the user is walking or running, a positioning function of positioning a position of the sensor device 2, and a communication function of transmitting the sensing result to the user terminal 3. The physical information acquired by the sensor device 2 is transmitted to the user terminal 3.

Figure 2:
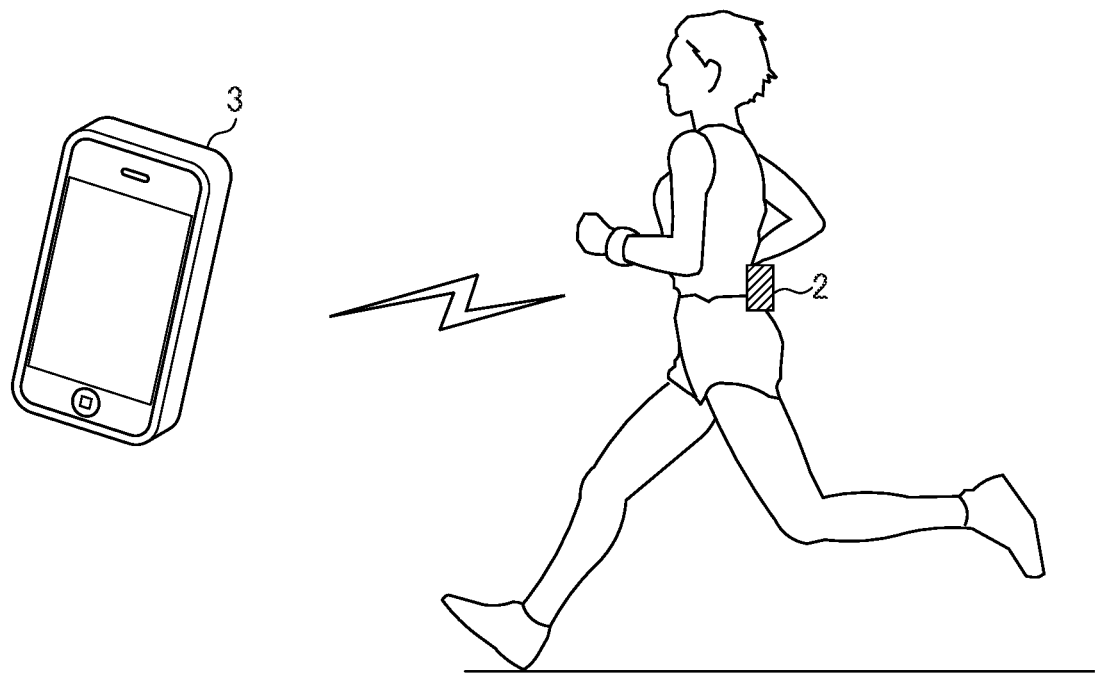
FIG. 2 is schematic diagram showing a usage example of sensor device according to the embodiment of the present invention.

An example of user information will be described which is acquired by the sensor device 2. FIG. 2 is a schematic diagram showing a usage example of the sensor device 2 according to the embodiment of the present invention. As shown in FIG. 2, the sensor device 2 of the present embodiment is attached near a waist along a trunk of the user who perform a predetermined exercise (the case of walking or running is described in the present embodiment, but the exercise is not limited thereto).

The sensor device 2 acquires a walking/running locus and a walking/running distance by the positioning function when an activity such as walking or running is performed. Further, in addition to the walking/running distance, a posture or the like during walking/running may be calibrated using an angle formed by an acceleration of gravity and an axis of the sensor device 2 in a longitudinal direction (a predetermine direction). In the following description, behavior information indicating the result of the activity acquired by the sensor device 2 is referred to as a log file.

The user terminal 3 is a communication device having an arithmetic processing function and a communication function. The user terminal 3 is implemented by, for example, a wearable device such as a smart phone, a tablet, or a smart watch that can be carried by the user.

The user terminal 3 of the present embodiment may function as a behavior analysis device having a communication function of receiving sensor information from the sensor device an analysis function of analyzing sensor information, a positioning function of positioning a posit the user terminal 3, and an output function of displaying and outputting the analysis result. By the output function of the user terminal 3, user can grasp the analysis result of the sensor information received from the sensor device 2 in a form that is easily and intuitively recognizable.

In response to an instruction from the sensor device 2, the user terminal 3 requests a connection to the management server 1, downloads a prediction ephemeris, and transmits the downloaded prediction ephemeris to the sensor device 2. For example, after acquiring the prediction ephemeris in a text data format from the management server 1, the user terminal 3 bundles data for a predetermined number of days (for example, three days) as one file in a binary format, and transmits the file to the sensor device 2.

In addition, the user terminal 3 transmits a current location and a current time retained by the user terminal 3 to the sensor device 2 in response to the connection request from the sensor device 2. The sensor device 2 uses the information acquired from the user terminal 3 to accurately acquire the position of the sensor device 2 with the positioning function described above.

[Hardware Configuration]

Figure 3:
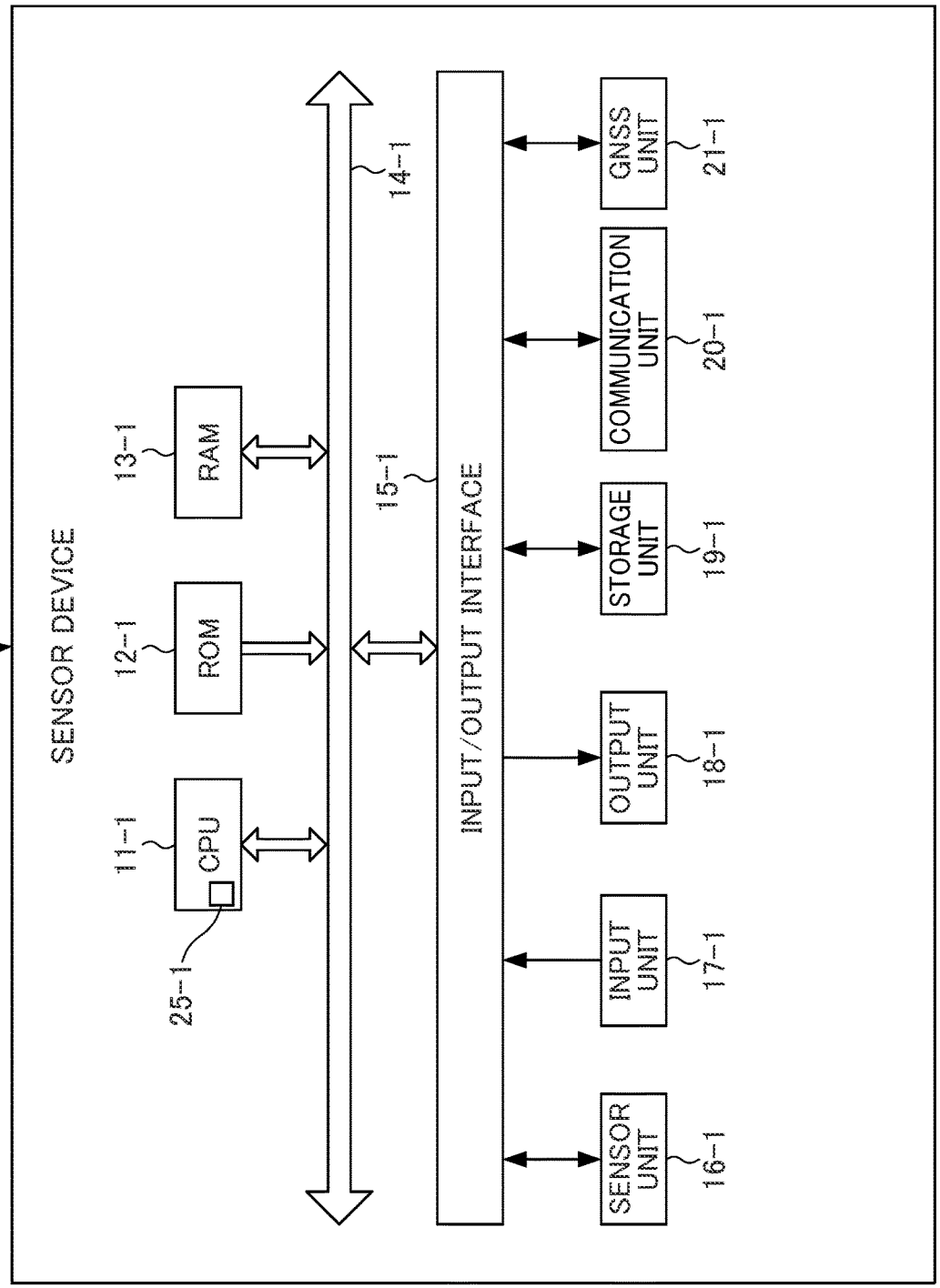
FIG. 3 is a block diagram showing a hardware configuration of the sensor device according to the embodiment of the present invention.

Next, an example of a hardware configuration of the sensor device 2 will be described. FIG. 3 is a block diagram showing a hardware configuration of the sensor device 2 according to the embodiment of the present invention. As shown in FIG. 3, the sensor device 2 includes a CPU (Central Processing Unit) 11-1, RGM (Read Only Memory) 12-1, a RAM (Random Access Memory) 13-1, a bus 14-1, an input/output interface 15-1, a sensor unit 16-1, an input unit 17-1, an output unit 18-1, a storage unit 19-1, a communication unit 20-1, and a GLASS unit 21-1.

The CPU 11-1 executes various processing according to programs recorded in the ROM 12-1 or programs loaded from the storage unit 19-1 to the RAM 13-1. Further, the CPU 11-1 is configured to be capable of reading current time information from a clocking function brought about by an RTC (Real Time Clock) 25-1 as a time generator provided inside.

The RAM 13-1 also appropriately stores data necessary for the CPU 11-1 to execute various processing.

The CPU 11-1, the ROM 12-1, and the RAM 13-1 are connected to each other via the bus 14-1. The input/output interface 15-1 is also connected to the bus 14-1. The input/output interface 15-1 is connected with the sensor unit 16-1, the input unit 17-1, the output unit 18-1, the storage unit 19-1, the communication unit 20-1, and the GNSS unit 21-1.

The sensor unit 16-1 is configured by various sensors (for example, an acceleration sensor and an angular velocity sensor) for measuring a three-dimensional movement of the sensor device 2 itself to detect at least acceleration and angular velocity given to the sensor device 2 according to a motion of a subject attached with it, and outputs the acceleration and angular velocity as sensor information. The output sensor information is stored in the storage unit 19-1 and transferred to the user terminal 3 later via the communication unit 20-1. In the present embodiment, start and end of the sensing are performed in response to an operation of the user to the input unit 17-1.

The input unit 17-1 is configured by various buttons, and inputs various information according to the instruction operation of the user.

The output unit 18-1 is configured by an LED (Light Emitting Diode) lamp, a display, and a speaker, and outputs light, images, and sounds.

The storage unit 19-1 is configured by a hard disk or a flash memory, and stores various data.

The communication unit 20-1 controls wireless or wired communication with another device using BLE (Bluetooth (registered trademark) Low Energy) or USB, for example.

The GNSS unit 21-1 performs positioning based on positioning satellite signals transmitted from positioning satellites. The GNSS unit 21-1 of the present embodiment includes an antenna, receives positioning satellite signals from a plurality of positioning satellites, and acquires position information of the sensor device 2.

The sensor device 2 may include a drive in which a removable medium such as a magnetic disk, an optical disk, a magneto-optical disk, or a semiconductor memory is appropriately mounted in addition to the configuration illustrated above. Programs and data read from the removable medium by the drive are installed in the storage unit 19 as necessary.

Figure 4:
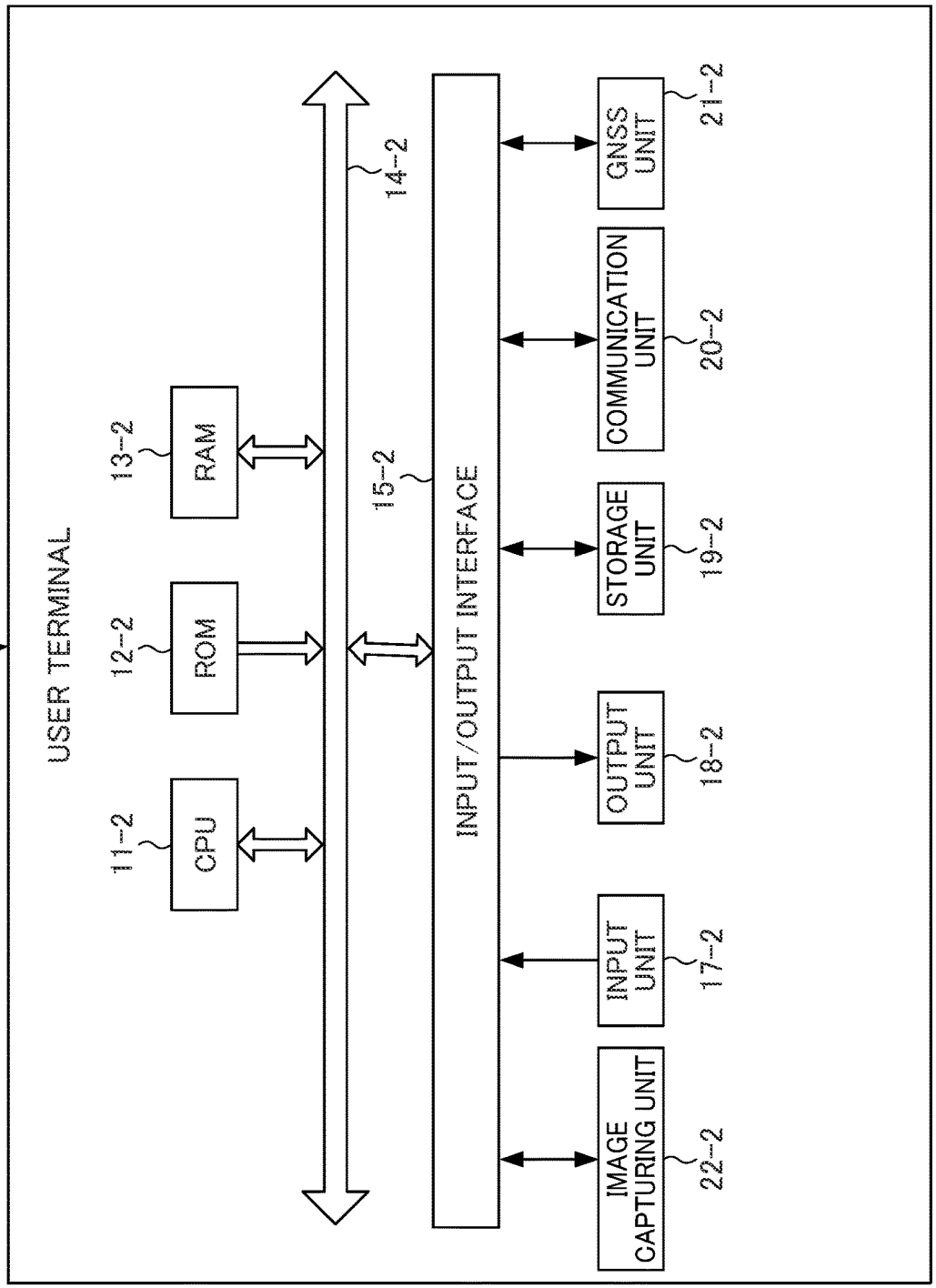
FIG. 4 is a block diagram showing a hardware configuration or a user terminal according to the embodiment of the present invention.

Next, a hardware configuration of the user terminal 3 will be described. FIG. 4 is a block diagram showing a hardware configuration of the user terminal 3 according to the embodiment of the present invention. As shown in FIG. 4, the user terminal 3 includes a CPU 11-2, a ROM 12-2, a RAM 13-2, a bus 14-2, an input/output interface 15-2, an input unit 17-2, an output unit 18-2, a storage unit 19-2, a communication unit 20-2, a GNSS unit 21-2, and an image capturing unit 22-2.

The configuration from the CPU 11-2 to the input/output interface 15-2, the configuration from the input unit 17-2 to the GNSS unit 21-2, and a drive not shown) are substantially the same as those of configuration of the sensor device 2. In the user terminal 3, the configuration similar to that of the sensor device 2 will not be described. The user terminal 3 further includes an image capturing unit 22-2. The image capturing unit 22-2 includes an optical lens and an image sensor which are not shown. Data of an image captured by the image capturing unit 22-2 is appropriately supplied to the 11-2 and an image processing unit (not shown).

The sensor device 2 acquires a prediction ephemeris via the user terminal 3, and acquires a position of the sensor device 2 itself using the prediction ephemeris. The prediction merit, is preferably an updated prediction ephemeris. Further, in order for t acquired prediction ephemeris to function efficiently, the position information of the sensor device 2 is necessary to be within a predetermined distance (for example, several tens of kilometers) from an actual position, or time information of the sensor device indicating e time is necessary to be within a predetermined time (for example, several tens of seconds) for an actual time.

Figure 5:
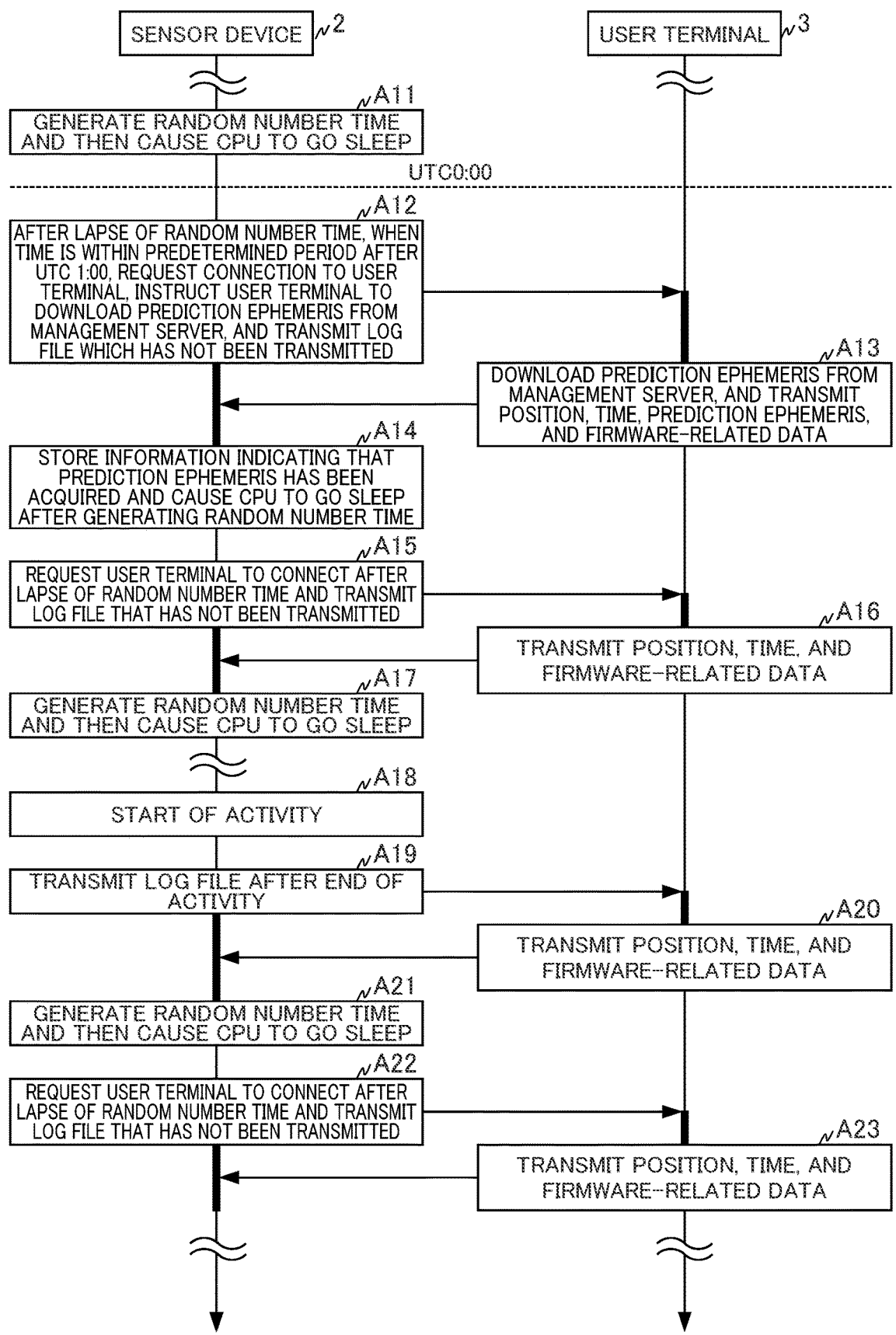
FIG. 5 sequence diagram illustrating data acquisition processing when the sensor device according to the embodiment of the present invention can acquire a prediction ephemeris from the user terminal within a predetermined period.

Next, overall flow of communication processing between the sensor device 2 and the user terminal 3 be described. FIG. 5 is a sequence diagram illustrating data acquisition processing when the sensor device 2 according to the embodiment of the present invention can acquire a prediction ephemeris from the user terminal 3 within a predetermined period.

In the sequence, it is assumed that the sensor device 2 and the user terminal 3 are subjected to pairing in a predetermined pairing mode. The pairing is a process of executing connection setting between the sensor device 2 and the user terminal 3. In the pairing process, counterpart pairing information required for connection is stored in each of the sensor device 2 and the user terminal 3. Through the pairing process, the sensor device 2 and the user terminal 3 become communicable. The pairing includes an instruction to cause the user terminal 3 to acquire the prediction ephemeris from the management server 1.

Further, the sequence will be described as starting from a time before UTC0:00 when the management server 1 starts updating the prediction ephemeris.

The sensor device 2 generates a random number time (for example, a random time between 1 and 3 hours) that determines a time from a sleep state to automatic operation start-up, sets an operation starting time to RTC 25-1 based on the generated random number time, and then causes the CPU 11-1 to go sleep (step A11). Thus, the communication between the sensor device 2 and the user terminal 3 is temporarily terminated. The random number time is a non-constant, irregular time calculated by predetermined processing. The random number time is set to different times whenever being calculated. Further, the operation starting time set based on the random number time is set to a time excluding UTC0:00 to 1:00, which is an update time zone in which the management server 1 updates the prediction ephemeris. The user terminal 3 preferably has a display function of being capable of grasping a sleep state of the sensor device 2.

The sensor device 2 starts operating the CPU 11-1 after the random number time has elapsed from the sleep state, and requests the paired user terminal 3 to connect. At this time, when the operation starting time is within a predetermined time (within a predetermined period) after UTC1:00, for example, within 1 to 3 hours, the sensor device 2 instructs the user terminal 3 to download the prediction ephemeris from the management server 1. Further, when the sensor device 2 retains a log file that has not yet been transmitted to the user terminal 3, the sensor device 2 transmits the log file to the user terminal 3, as a log file that has not been transmitted to the user terminal 3 (step A12). By a timer function of the RTC 25-1 in which an operation starting time is set, the CPU 11-1 starts to operate due to an interruption signal, which is output by RTC 25-1 at the operation starting time.

The user terminal 3, which has received the connection reguest from the sensor device downloads the prediction ephemeris from the management server. Then, the user terminal 3 transmits position and time data, the downloaded prediction ephemeris, and firmware-related data to the sensor device 2 (step A13). The position and time data transmitted in the process of step A13 are accurate data based on information acquired by the user terminal 3 through communication with base station, and the prediction ephemeris is downloaded from the management server 1 after the update processing as described above, whereby the prediction ephemeris of the sensor device 2 is appropriately updated to the latest prediction ephemeris. In addition, the firmware-related data is data regarding whether firmware of the sensor device 2 updated, or update data for updating the firmware. Although this applies to the following firmware-related data transmission, when there is no data related to the update of the firmware, the process of transmitting the firmware-related data to the sensor device 2 may be omitted.

After receiving the position and time data, the prediction ephemeris, and t' e firmware-related data from the user terminal 3, the sensor device 2 generates a random number time that determines the time until starting to automatically operate from the sleep state, and then causes the CPU 11-1 to go to sleep. Further, before going to sleep, information indicating that the prediction ephemeris can be acquired within the predetermined period is stored in one region (a communication information storage unit 192 which will be described below) of the storage unit 19-1 (step A14). Thus, the communication between the sensor device 2 and the user terminal 3 is temporarily terminated.

The sensor device starts operating the CPU 11-1 after the random number time has elapsed from the sleep state, and requests the paired user terminal 3 to connect. Further, when the sensor device 2 retains a log file that has not yet been transmitted to the user terminal 3, the sensor device 2 transmits the log file to the user terminal 3, as a log file that has not been transmitted to the user terminal 3. (step A15).

The user terminal 3, which has received the connection request from the sensor device transmits the position and time data and the firmware-related data to the sensor device 2 (step A16).

After receiving the position and time data and the firmware-related data from the user terminal 3, the sensor device 2 generates a random number time that determines the time until starting to automatically operate from the sleep state, and causes the CPU 11-1 to go to sleep (step A17).

When it is detected by a user's operation that the sleep is canceled and an activity starts, the sensor device 2 starts acquiring data indicating the result of the user's activity (step A18). The data acquired by the sensor device becomes a log file. For example, when the user performs running as an activity, running-related data, for example, a running locus, a running distance, a speed, a running pitch, a stride, and a posture are stored as a log file.

It is detected by a user's operation that the activity is ended, the sensor device transmits the acquired log file to the user terminal 3 (step A19). The start and end of the activity can be detected by the user's direct operation on the sensor device 2, but the start of the activity may be automatically detected by the sensor device 2 based on the information of the sensor unit 16-1 or may be automatically detected by the sensor device 2 based on the instruction received from the user terminal 3.

When receiving the log file from the sensor device 2, the user terminal 3 transmit the firmware-related data to the sensor device 2 together with the position and time data (step A20).

After receiving the position and time data and the firmware-related data from the user terminal 3, the sensor device 2 generates the random number time that determines the time until starting to automatically operate from the sleep st and then causes the CPU 11-1 to go sleep (step A21). Even when the user turns off power of the sensor device 2 alter the process of step A19, the sensor device 2 maintains the connection state with the user terminal 3 and continues data communication when the communication is established.

The sensor device starts operating the CPU 11-1 after the random number time has elapsed from the sleep state, and requests the paired user terminal 3 to connect. Further, when the sensor device 2 retains a log file that has not yet been transmitted to the user terminal 3, the sensor device 2 transmits the log file to the user terminal 3, as a log file that has not been transmitted to the user terminal 3. (step A22)

The user terminal 3, which has received the connection request from the sensor device transmits the position and time data and the firmware-related data to the sensor device 2 (step A23). Thereafter, similar sequence is performed between the sensor device 2 and the user terminal 3.

Figure 6:
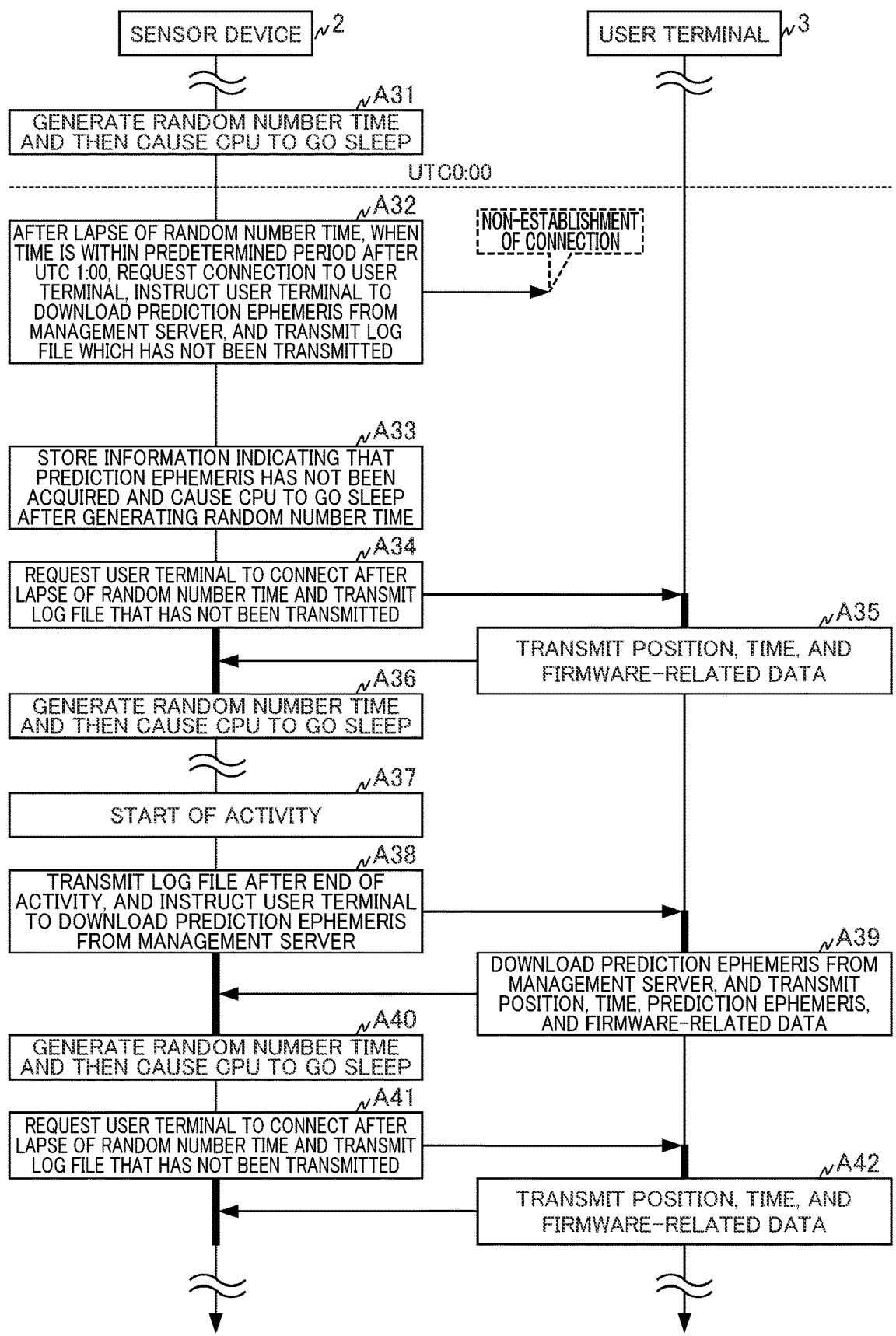
FIG. 6 is a sequence diagram illustrating the data acquisition processing in the case where the sensor device according to the embodiment of the present invention cannot acquire the prediction ephemeris from the user terminal within the predetermined period.

Next, data acquisition processing win be described will be described with reference to FIG. 6 in a case where the sensor device 2 according to the embodiment of the present invention cannot acquire the prediction ephemeris from the user terminal 3 within the predetermined period. FIG. 6 is a sequence diagram illustrating the data acquisition processing in the case where the sensor device 2 according to the embodiment of the present invention cannot acquire the prediction ephemeris from the user terminal 3 within the predetermined period. As in FIG. 5, it is assumed that the sensor device 2 and the user terminal 3 are subjected to pairing in a predetermined pairing mode, and the sequence will be described as starting from the time before UTC0:00 when the management server 1 starts updating the prediction ephemeris.

The sensor device 2 generates a random number time (for example, a random time between 1 and 3 hours) that determines a time from a sleep state to an automatic operation start-up, sets an operation starting time to the RTC 25-1 based on the generated random number time, and then causes the CPU 11-1 to go sleep (step A31). Thus, the communication between the sensor device 2 and the user terminal 3 is temporarily terminated. The random number time is a non-constant, irregular time calculated by predetermined processing. The random number time is set to different times whenever being calculated. Further, the operation starting time set based on the random number time is set to a time excluding UTC0:00 to 1:00, which is an update time zone in which the management server 1 updates the prediction ephemeris.

The sensor device 2 starts operating the CPU 11-1 after the random number time has elapsed from the sleep state, and requests the paired user terminal 3 to connect. At this time, when the operation starting time is within a predetermined time (within a predetermined period) after UTC1:00, for example, within 1 to 3 hours, the sensor device 2 instructs the user terminal 3 to download the prediction ephemeris from the management server 1. Further, when the sensor device 2 retains a log file that has not yet been transmitted to the user terminal 3, the sensor device 2 transmits the log file to the user terminal 3, as a log file that has not been transmitted to the user terminal 3. (step A32).

At this time, for example, the power of the user terminal 3 is turned off, or when the user terminal 3 is separated from the sensor device 2 to a position where communication cannot be performed, the communication is not established. When the connection is not established and no response to the connection request is returned from the user terminal 3, the sensor device 2 generates a random number time that determines the time until starting to automatically operate from the sleep state, and then causes the CPU 11-1 to go to sleep. Further, before going to sleep, information indicating ghat the prediction ephemeris can be acquired within the predetermined period is stored in one region (the communication information storage unit. 192 which will be described below) of the storage unit 19-1 (step A33). Thus, the communication between the sensor device 2 and the user terminal 3 is temporarily terminated.

The sensor device 2 starts operating the CPU 11-1 after the random number time has elapsed from the sleep state, and requests the paired user terminal 3 to connect. Further, when the sensor device 2 retains a log file that has not yet been transmitted to the user terminal 3, the sensor device 2 transmits the log file to the user terminal 3, as a log file that has not been transmitted to the user terminal 3. (step A34).

The user terminal 3, which has received the connection request from the sensor device 2, transmits the position and time data and the firmware-related data to the sensor device 2 (step A35).

After receiving the position and time data and the firmware-related data from the user terminal 3, the sensor device 2 generates a random number time that determines the time until starting to automatically operate from the sleep state, and causes the CPU 11-1 to go to sleep (step A36).

When it is detected by a user's operation that the sleep is canceled and an activity starts, the sensor device 2 starts acquiring data indicating the result of the user's activity (step A37). The data acquired by the sensor device 2 becomes a log file. For example, when the user performs running as an activity, running-related data, for example, a running locus, a running distance, a speed, a running pitch, a stride, and a posture are stored as a log file.

It is detected by a user's operation that the activity is ended, the sensor device 2 transmits the acquired log file to the user terminal 3. At this time, when the storage unit 19-1 stores the information indicating that the prediction ephemeris cannot be acquired, the sensor device 2 instructs the user terminal 3 to download the prediction ephemeris from the management server 1 (step A38).

When receiving the instruction to download the log file from the sensor device 2 and the prediction ephemeris from the management server 1, the user terminal 3 downloads the prediction ephemeris from the management server 1 and transmits the firmware-related data to the sensor device 2(step A39). Since the prediction ephemeris of the user terminal 3 transmitted in the process of step A39 is downloaded from the management server 1 after the update processing as described above, the prediction ephemeris of the sensor device 2 is appropriately updated to the latest prediction ephemeris.

After receiving the position and time data, the prediction ephemeris, and the firmware-related data from the user terminal 3, the sensor device 2 generates a random number time that determines the time until starting to automatically operate from the sleep state, and causes the CPU 11-1 to go to sleep (step A40).

The sensor device 2 starts operating the CPU 11-1 after the random number time has elapsed from the sleep state, and requests the user terminal 3 to connect. Further, when the sensor device 2 retains a log file that has not yet been transmitted to the user terminal 3, the sensor device 2 transmits the log file to the user terminal 3, as a log file that has not been transmitted to the user terminal 3 (step A41).

The user terminal 3, which has received the connection request from the sensor device 2, transmits the position and time data and the firmware-related data to the sensor device 2 (step A42). Thereafter, similar sequence is performed between the sensor device 2 and the user terminal 3.

Figure 7:
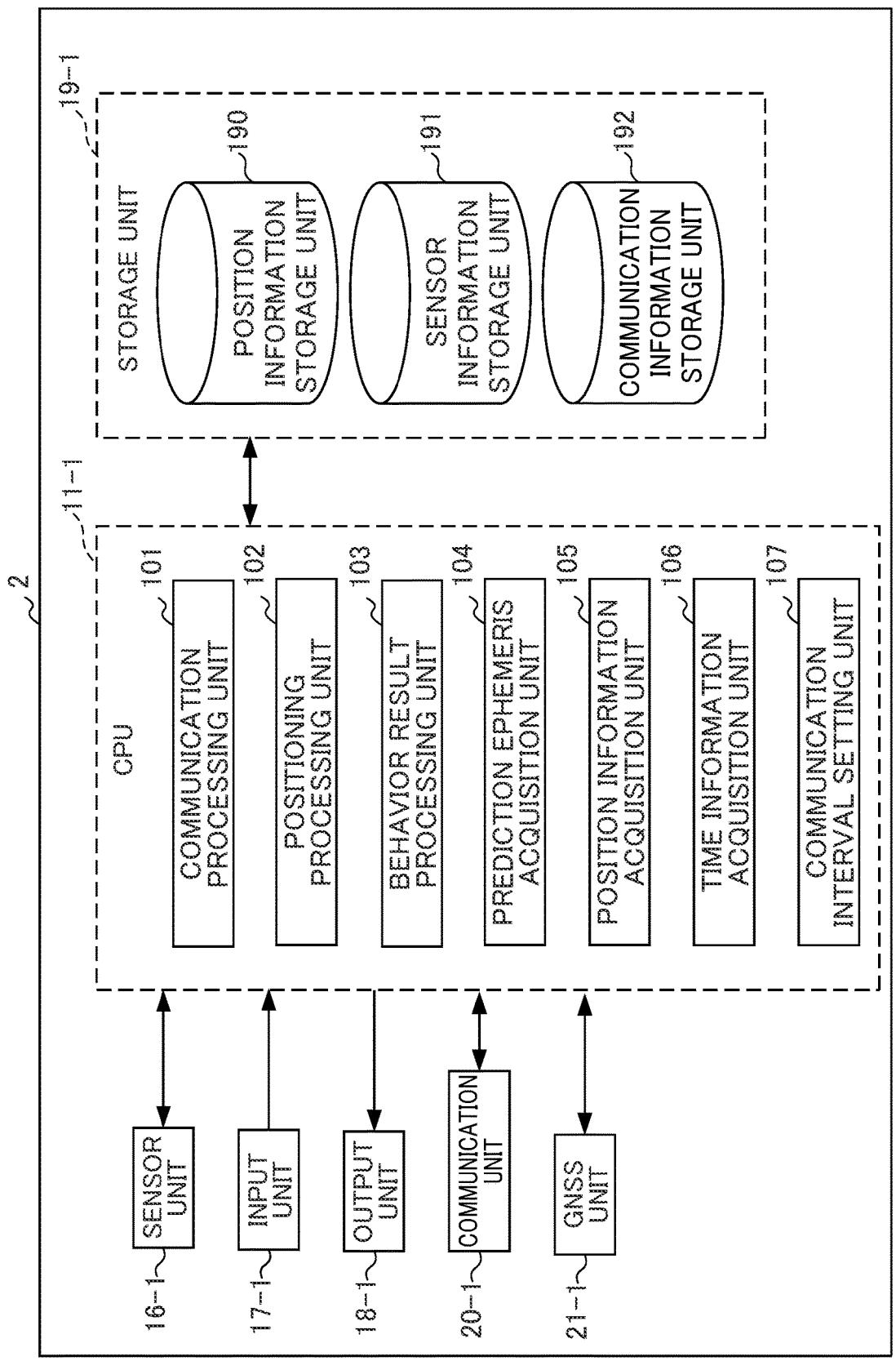
FIG. 7 is a functional block diagram showing a functional configuration for executing processing related to a prediction ephemeris in the functional configuration of the sensor device according to the embodiment of the present invention.

Next, processing related to the prediction ephemeris of the sensor device 2 of the present embodiment will be described. FIG. 7 is a functional block diagram showing a functional configuration for executing the processing related to the prediction ephemeris in the functional configuration of the sensor device 2 according to the embodiment of the present invention.

[Functional Block]

As shown in FIG. 7, one region the storage unit 19-1 includes a positioning information storage unit 190 that stores information related to positioning including the position information and the prediction ephemeris, a sensor inform on storage unit 191 that stores information related to the user's activity acquired by the sensor device 2, and a communication information storage unit 192 that stores information related to the communication with the user terminal 3.

In the sensor device 2 of the present embodiment, the CPU 11-1 functions as a communication processing unit 101, a positioning processing unit 102, a behavior result processing unit 103, a prediction ephemeris acquisition unit 104, a position information acquisition unit 105, a time information acquisition unit 106, and a communication interval setting unit 107, and implements the processing related to the prediction ephemeris. Data necessary for realizing the processing related to the prediction ephemeris is appropriately transmitted and received between these functional blocks at appropriate timing, including cases not specifically described below.

The communication processing unit 101 executes processing for establishing communication between the sensor device 2 and the user terminal 3. The communication processing unit 101 executes pairing processing between the sensor device 2 and the user terminal 3 and processing related to transmission and reception of various data such as the prediction ephemeris between the sensor device 2 and the user terminal 3. As described above, connection between the sensor device 2 and the user terminal 3 is established by BLE in the present embodiment.

The positioning processing unit 102 executes positioning processing of the sensor device 2 based on the prediction ephemeris. The prediction ephemeris is used as orbit information in calculated of the positioning, processing, and is also used as search information for searching satellites used for positioning. The positioning processing unit 102 can search for a satellite in a short time by narrowing down a range for searching for the satellite based on the current position retained by the sensor device 2, the orbit of the satellite indicated by the prediction ephemeris, and the time. The positioning processing unit 102 performs the positioning processing to specify an exact position, based on a distance to a receiver acquired from signals of a plurality of satellite (for example, three or four satellites) specified by the search processing and the position of the satellite indicated by the prediction ephemeris.

The behavior result processing unit 103 acquires a log file of an activity as a behavior result of the user, and executes processing for transmitting the acquired log file to the paired user terminal 3. In the present embodiment, the activity includes behaviors involving movement, for example, walking and running. The behavior result processing unit 103 acquires, as a log file information indicating changes in the user's activity, which preset based on the activity determined by the user's operation.

The prediction ephemeris acquisition unit 104 executes processing for acquiring the prediction ephemeris from the user terminal 3. In the present embodiment, the prediction ephemeris acquisition unit 104 executes processing for requesting the user terminal 3 to transmit the prediction ephemeris at a starting timing of the sensor device 2 or a transmission timing of the log file. As described above, the prediction ephemeris acquisition unit 104 transmits an instruction to the user terminal 3 to download the prediction ephemeris from the management server 1, receives the prediction ephemeris, which is downloaded by the user terminal 3 based on the instruction, from the user terminal 3, and stores the prediction ephemeris.

The position information acquisition unit 105 acquires the position information of the sensor device 2 positioned by the positioning processing unit 102. Further, the position information acquisition unit 105 of the present embodiment executes processing for acquiring, as reference information, communication device position information indicating the position of the user terminal 3 in order to confirm whether the position information stored in the positioning information storage unit 190 is appropriate.

The time information acquisition unit 106 executes processing for acquiring time information indicating the current time from the RTC 25-1. Further, the time information acquisition unit 106 of the present embodiment executes processing for acquiring, as reference information, time information possessed by the user terminal 3 in order to confirm whether the current time information is appropriate.

The communication interval setting unit 107 sets an interval of timing at which the communication device position information and the time information are acquired from the user terminal 3. In the present embodiment, an acquisition timing is changed based on the communication device position information and the time information acquired as the reference information from the user terminal 3. More specifically, when there is a large discrepancy between the information indicating the position and time of the sensor device 2 and the information indicating the position and time of the user terminal 3, the communication interval setting unit executes processing for shortening the interval at which, the connection request is issued to the user terminal 3 subjected to pairing.

Figure 8:
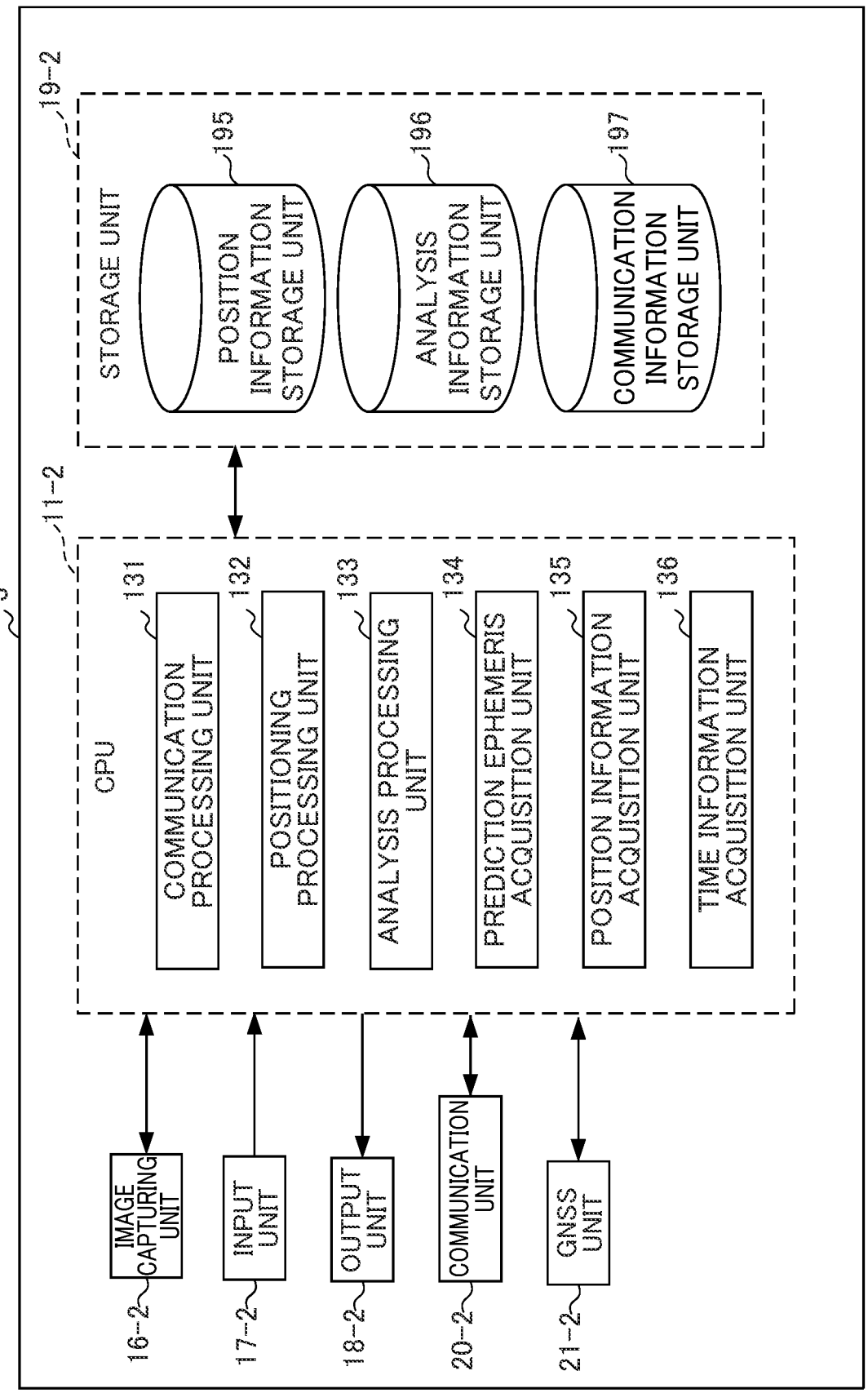
FIG. 8 is a functional block diagram showing a functional configuration for executing processing related to a prediction ephemeris in the functional configuration of the user terminal according to the embodiment of the present invention.

Next, functional blocks of the user terminal 3 will be described. FIG. 8 is a functional block diagram showing a functional configuration for executing the processing related to the prediction ephemeris in the functional configuration of the user terminal 3 according to the embodiment of the present invention.

As shown in FIG. 8, one region of the storage unit 19-2 includes a positioning information storage unit 195 that stores information related to positioning such as position information, an analysis information storage unit 196 that stores information related to the user's activity received from the sensor device 2 and the analysis result of the information, and a communication information storage unit 197 that stores information related to the communication with the sensor device 2.

In the user terminal 3 of the present embodiment, the CPU 11-2 functions as a communication processing unit 131, a positioning processing unit 132, an analysis processing unit 133, a prediction ephemeris acquisition unit 134, a position information acquisition unit 135, and a time information acquisition unit 136, and implements the processing related to the prediction ephemeris. Data necessary for realizing the processing related to the prediction ephemeris is appropriately transmitted and received between these functional blocks at appropriate timing, including cases not specifically described below.

The communication processing unit 131 and the positioning processing unit 132 implement functions similar to those of the communication processing unit 101 and the positioning processing unit 102 of the sensor device 2.

The analysis processing unit 133 analyzes the activity log file received from the sensor device 2. For example, the analysis processing unit 133 performs processing for evaluating a running distance and a posture during running and processing for displaying evaluation results.

The prediction ephemeris acquisition unit 134 executes processing for downloading the prediction ephemeris from the management server 1. The prediction ephemeris acquisition unit 104 of the present embodiment downloads the prediction ephemeris from the management server 1 when receiving a download instruction from the sensor device 2. The user terminal 3 may download the prediction ephemeris by itself instead of the instruction from the sensor device 2. In this case, the user terminal 3 preferably downloads the prediction ephemeris from the management server 1 at an appropriate random timing after the update time zone of the management server 1 has elapsed.

The position information acquisition unit 135 acquires the position information of the user terminal 3 by positioning processing or by a signal from the base station, and stores the position information. The position information acquired by the position information acquisition unit 135 is transmitted to the sensor device 2 in response to a request from the sensor device 2.

The time information acquisition unit 136 acquires the current time information indicating the current time from the RTC 25-1 or by a signal from the base station, and stores the current time information. The time information acquired by the time information acquisition unit 136 is transmitted to the sensor device 2 in response to a request from the sensor device 2.

Figure 9:
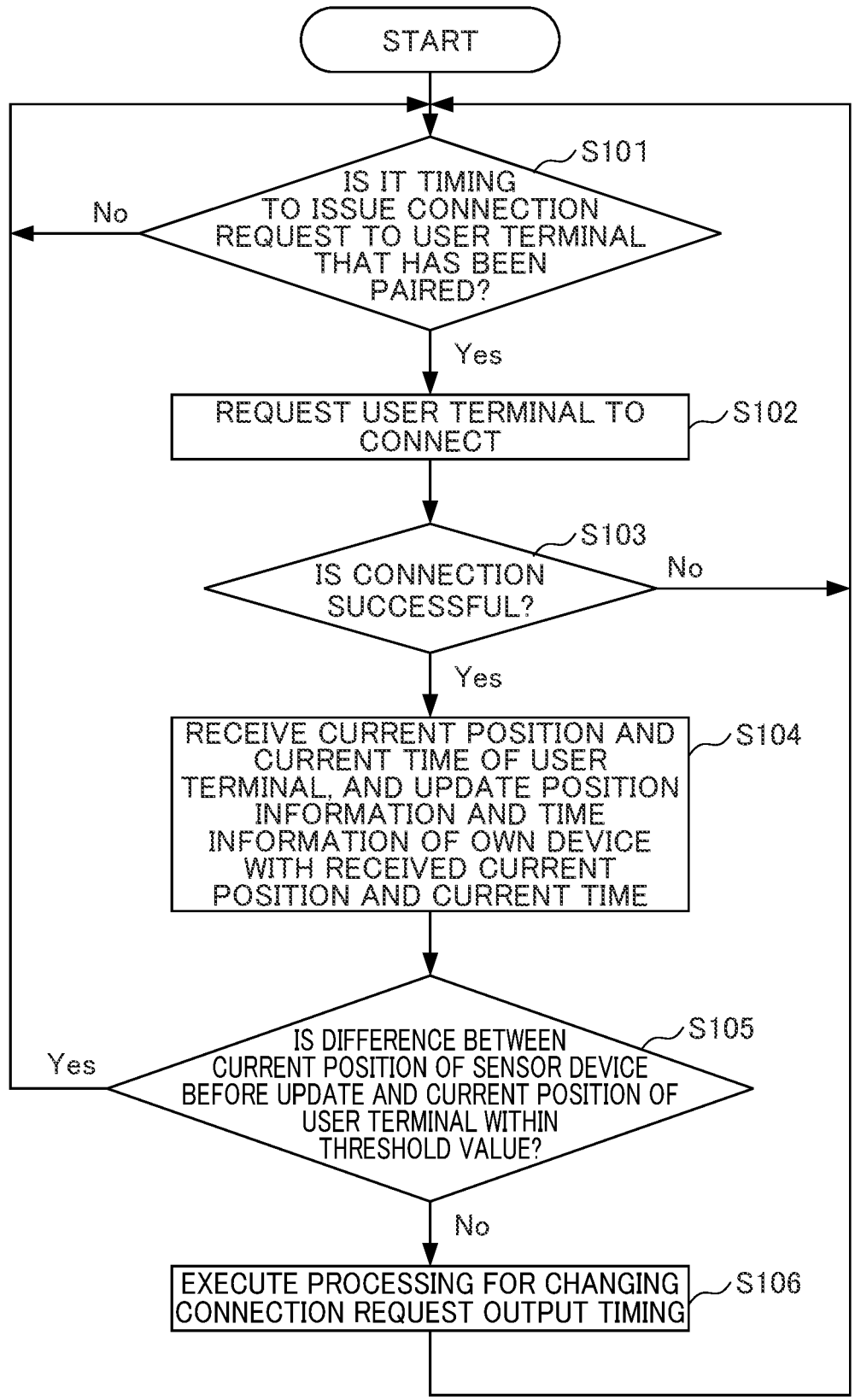
FIG. 9 is a flowchart showing a flow of processing for acquiring position information and time information of the sensor device according to the embodiment of the present invention.

Next, referring to FIG. 9, a description will be given with respect to processing for using the information of the user terminal 3, which retains more accurate position information and time information compared with the sensor device 2, so as to avoid a decrease in efficiency of a satellite searching process. FIG. 9 is a flowchart showing a flow of processing for acquiring position information and time information of the sensor device 2 according to the embodiment of the present invention. FIG. 9 shows processing for acquiring position information and time information after the operation of the sensor device 2 ends and the prediction ephemeris and the position information and time information are acquired.

When the flowchart shown in FIG. 9 is started, the communication processing unit 101 determines whether it is a timing to issue a connection request to the user terminal 3 that has been paired (step S101). In the present embodiment, when the above-described random number time elapses or the start of the activity by the user is detected, it is determined that it is the timing to issue the connection request to the user terminal 3 that has been paired. When it is determined that it is the timing to issue the connection request (Yes in step S101), the process proceeds to step S102. When it is determined that it is not the timing to issue the connection request (No in step S101), the determination of step S101 is repeated until it is determined that it is the timing to issue the connection request.

When it is determined that it is the timing to issue the connection request to the user terminal 3 that has been paired, the communication processing unit 101 transmits the connection request to the user terminal 3 (step S102). Then, the communication processing unit 101 determines whether the connection is successful (step S103). When the connection is successful (Yes in step S103), the process proceeds to step S104, and when the connection fails (No in step S103), the process returns to step S101.

When the connection between the sensor device 2 and the user terminal 3 is successful, the position information acquisition unit 105 receives the communication device position information indicating the current position of the user terminal 3 from the user terminal 3 and stores the received information, and the time information acquisition unit 106 receives the communication device time information indicating the time of the user terminal 3 from the user terminal 3 and stores the received information. Then, the position information and time information of its own device (sensor device 2) are updated with the received communication device position information and communication device time information (step S104).

The communication interval setting unit 107 compares the position information indicating the current position of the sensor device 2 before being updated in step S104 with the communication device position information indicating the current position of the user terminal 3 downloaded from the user terminal 3, and determines whether a difference therebetween exceeds a threshold value (step S105). For example, when a distance between the position indicated by the position information retained by the sensor device 2 and the position indicated by the communication device position information retained by the user terminal 3 exceeds the preset distance (for example, several tens of kilometers), the position information acquisition unit 105 determines that the distance exceeds the threshold value. When it is determined in step S105 that the distance does not exceed the threshold value (Yes in step S105), the process returns to step S101, and when the processes after step S101 are repeated and it is determined that the distance exceeds the threshold value (No in step S105), the process proceeds to step S106.

In step S106, the communication processing unit 101 executes processing for changing the timing at which the connection request is output. In the process of step S106, the timing of outputting the connection request is changed from long intervals to short intervals. For example, when a reference interval at which the connection request is output is 3 hours, a reference interval at which the next connection request is output is changed at intervals of 10 minutes, for example. When a random number generation time is used, an additional time set by a random number may be set to the reference interval changed in step S106. This makes it possible to make the interval small even when the random number is used. Thereafter, the process returns to step S101, and the processes after step S101 are repeated.

As described above, the sensor device 2 as an information processing device includes: the communication processing unit 101 that communicates with the user terminal 3 as a communication device configured to download the prediction ephemeris from the external device (the management server 1); the positioning processing unit 102 that acquires the current position using the prediction ephemeris; the prediction ephemeris acquisition unit 104 that instructs the user terminal 3 to download the prediction ephemeris from the external device through the communication by the communication processing unit 101 and executes the processing for acquiring the prediction ephemeris from the user terminal 3; the positioning information storage unit 190 as a storage unit that stores the position information indicating the current position acquired by the positioning processing unit 102; the position information acquisition unit 105 as an information acquisition unit that repeats, at intervals, processing for acquiring the communication device position information indicating the position of the user terminal 3 from the user terminal 3 and updating the position information based on the communication device position information; and the communication interval setting unit 107 that, a case where a discrepancy between the position information stored in the positioning information storage unit 190 and not yet updated by the position information acquisition unit 105 and the communication device position information acquired by the position information acquisition unit 105 is larger than the predetermined reference, makes next and subsequent intervals at which the position information acquisition unit 105 acquires the communication device position information shorter than the current interval.

Thereby, long-distance movement and ON/OFF of power are repeated, the interval between the timings at which the connection request is output is shortened even when the position information of the sensor device 2 is to be isolated from the actual position, and thus the time until the position information is corrected based on the communication position information of the user terminal 3 after the discrepancy occurs is shortened. Using the user terminal that acquires the position information by a method different from that of the sensor device 2 makes possible to effectively prevent the occurrence of a situation in which the processing using the prediction ephemeris is performed based on inaccurate position information.

Further, the sensor device 2 of the present embodiment further includes the RTC 25-1 as a time generator that generates the time information indicating the time and the time information acquisition unit as an information acquisition unit, and the time information acquisition unit 106 repeats, at intervals, the processing for acquiring, from the user terminal 3, the communication device time information indicating the current time possessed by the user terminal 3 and updating the time information based on the communication device time information.

Thereby, by using the user terminal 3 that acquires the time information by a method different from that of the sensor device 2, it is possible to effectively prevent the occurrence of a situation in which the processing using the prediction ephemeris is performed based on inaccurate time information. For example, since not only the position information but also the time information are used in the search processing, the time information is preferably accurate. In this regard, with the configuration of the present embodiment, it is possible to correct a time error caused by the STC 25-1 of the sensor device 2 using the user terminal 3 that acquires the accurate time information from the base station as well.

Further, the sensor device 2 of the present embodiment further includes the behavior result processing unit 103 that acquires the log file (behavior information) indicating the result of the user's behavior. Then, the behavior result processing unit 103 transmits the log file to the user terminal 3 after acquiring the log file, and the position information acquisition unit 105 executes the processing for acquiring the communication device position information from the user terminal 3 based on the timing at which the log file is transmitted to the user terminal 3 and updating the position information based on the communication device position information.

Thereby, the position information can be acquired from the user terminal 3 more reliably in the state where the communication is established, and the position information of the sensor device 2 can be reliably updated based on the communication device position information of the user terminal 3 at the timing when the activity is executed.

Further, the sensor device 2 of the present embodiment further includes the behavior result processing unit 103 that acquires the log file (behavior information) indicating the result of the user's behavior. Then, the behavior result processing unit 103 transmits the log file to the user terminal 3 after acquiring the log file, and the time information acquisition unit 106 executes the processing for acquiring the communication device time information from the user terminal 3 based on the timing at which the log file is transmitted to the user terminal 3 and updating the time information based on the communication device time information.

Thereby, the time information can be acquired from the user terminal 3 more reliably in the state where the communication is established, and the time information of the sensor device 2 can be reliably updated based on the communication device time information of the user terminal 3 at the timing when the activity is executed.

Further, the behavior result processing unit 103 of the present embodiment acquires the result of the behavior involving movement the user, as the behavior information.

Thereby, the position information is compared whenever the activity involving movement that uses the positioning inform on is executed, and thus the position information is not accurately maintained, whereby it tales a long time to perform the search processing and is possible to more reliably avoid the occurrence of a situation that affects analysis processing.

In the above-described embodiment, an example has been described in which the pairing is performed at a short interval even when there is a large discrepancy between the time information of the sensor device 2 and the communication device time information of the user terminal 3, but the present invention is not limited thereto. For example, when the time accuracy of the RTC 25-1 provided in the CPU 11-1 of the sensor device 2 is high (for example, monthly difference being ±10 seconds or shorter), the process of comparing the current time of step S106 may be omitted, and the process may be returned to step S101 after step S105 (Yes). Alternatively, the interval may be made smaller when both the position and the time have a large discrepancy. In other words, the interval may be changed to be made smaller depending on degrees of the discrepancies of the position and the time and situations.

Hereinbefore, an embodiment of the present invention has described. The processing sequence described above can be executed by hardware, and can also be executed by software. In other words, the functional configuration of FIG. 7 is merely an illustrative example, and the present invention is not particularly limited thereto. More specifically, the types of functional blocks employed to realize the above-described functions are not particularly limited to the examples shown in FIG. 7, so long as the information processing device can be provided with the functions enabling the aforementioned processing sequence to be executed in its entirety. In addition, a single functional block may be configured by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific integrated Circuit) or FPGA (Field-Programmable Gate Array).

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium distributed separately from the device main body for supplying the program to a user, but also can be constituted by a storage medium or the like supplied to the user in a state incorporated in the device main body in advance. The removable medium is composed of, for example, a magnetic disk (including a floppy disk), an optical disk, a magnetic optical disk, or the like. The optical disk is composed or, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 3 in which the program is recorded or a hard disk included in the storage unit 19 of FIGS. 3, etc.

It should be noted that, in the present specification, the steps defining the program recorded in the storage medium include not only the processing executed. In a time series following this order, but also processing executed in parallel or individually, which is not necessarily executed in a time series. Further, in the present specification, the terminology of the system means an entire apparatus including a plurality of apparatuses and a plurality of units.

The embodiments of the present invention described above are only illustrative, and are not to limit the technical scope of the present invention. The present invention can assume various other embodiments. Additionally, possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

INDUSTRIAL APPLICABILITY

The present invention is particularly useful in acquiring position information for efficiently utilizing a prediction ephemeris acquired from an external device. According to the present invention, using a communication device that acquires the position information by a method different from that of an information processing device makes it possible to effectively prevent the occurrence of a situation in which the processing using the prediction ephemeris is performed based on inaccurate position information.

EXPLANATION OF REFERENCE NUMERALS

1: Management server (Management device)
2: Sensor device (Information processing device)
3: User terminal (Communication device)
25-1: RTC (Time generator)
101: Communication processing unit
102: Positioning processing unit
103: Behavior result processing unit
104: Prediction ephemeris acquisition unit (Positioning satellite information acquisition unit)
105: Position information acquisition unit (Information acquisition unit)
106: Time information acquisition unit (Information acquisition unit)
107: Communication interval setting unit
190: Positioning information storage unit (Storage unit)

The invention claimed is:

1. An information processing device comprising:
at least one processor that executes a program stored in a memory; and
storage;
wherein the processor is configured to execute processing including:
communicating with a communication device configured to download a prediction ephemeris from an external device, and instructing the communication device to download the prediction ephemeris from the external device;
acquiring the prediction ephemeris from the communication device;
determining a current position using the prediction ephemeris acquired from the communication device and storing position information indicating the current position in the storage; and
repeating, at intervals:
(i) acquiring, from the communication device, communication device position information indicating a position of the communication device;
(ii) updating the position information stored in the storage based on the communication device position information;
(iii) comparing the position information stored in the storage before the updating with the acquired communication device position information, and determining whether a discrepancy between the position information stored in the storage before the updating and the acquired communication device position information is larger than a predetermined threshold; and
(iv) making next and subsequent intervals at which the communication device position information is acquired shorter than a current interval in response to a determination that the discrepancy between the position information stored in the storage before the updating and the acquired communication device position information is larger than a predetermined threshold.

2. The information processing device according to claim 1, wherein the processor is configured to further execute processing comprising:
generating time information indicating a time; and
repeating, at intervals, acquiring, from the communication device, communication device time information indicating a current time possessed by the communication device and updating the time information based on the communication device time information.

3. The information processing device according to claim 2, wherein the processor is configured to further execute processing comprising:
acquiring behavior information indicating a result of a user's behavior;
transmitting the behavior information to the communication device after acquiring the behavior information; and
acquiring the communication device time information from the communication device based on a timing at which the behavior information is transmitted to the communication device and updating the time information based on the communication device time information.

4. The information processing device according to claim 3, wherein the processor is configured to further execute processing comprising:
acquiring a result of a behavior involving movement of the user, as the behavior information.

5. The information processing device according to claim 1, wherein the processor is configured to further execute processing comprising:
acquiring behavior information indicating a result of a user's behavior;
transmitting the behavior information to the communication device after acquiring the behavior information; and
acquiring the communication device position information from the communication device based on a timing at which the behavior information is transmitted to the communication device and updating the position information based on the communication device position information.

6. The information processing device according to claim 5, wherein the processor is configured to further execute processing comprising:
acquiring a result of a behavior involving movement of the user, as the behavior information.

7. A behavior analysis system comprising a communication device configured to download a prediction ephemeris from an external device and an information processing device configured to communicate with the communication device,
the information processing device including:
at least one processor that executes a program stored in a memory; and
storage;
wherein the processor is configured to execute processing including:
communicating with the communication device, and instructing the communication device to download the prediction ephemeris from the external device;
acquiring the prediction ephemeris from the communication device;
determining a current position using the prediction ephemeris acquired from the communication device and storing position information indicating the current position in the storage; and
repeating, at intervals:
(i) acquiring, from the communication device, communication device position information indicating a position of the communication device;
(ii) updating the position information stored in the storage based on the communication device position information;
(iii) comparing the position information stored in the storage before the updating with the acquired communication device position information, and determining whether a discrepancy between the position information stored in the storage before the updating and the acquired communication device position information is larger than a predetermined threshold; and
(iv) reducing an interval at which the communication device position information is acquired in response to a determination that the discrepancy between the position information stored in the storage before the updating and the acquired communication device position information is larger than a predetermined threshold.

8. The behavior analysis system according to claim 7, wherein the processor is configured to further execute processing comprising:

generating time information indicating a time; and repeating, at intervals, acquiring, from the communication device, communication device time information indicating a current time possessed by the communication device and updating the time information based on the communication device time information.

9. The behavior analysis system according to claim 8, wherein the processor is further comprising to execute processing comprising:

acquiring behavior information indicating a result of a user's behavior;

transmitting the behavior information to the communication device after acquiring the behavior information; and acquiring the communication device time information from the communication device based on a timing at which the behavior information is transmitted to the communication device and updating the time information based on the communication device time information.

10. The behavior analysis system according to claim 9, wherein the processor is configured to further execute processing comprising:

acquiring a result of a behavior involving movement of the user, as the behavior information.

11. The behavior analysis system according to claim 7, wherein the processor is configured to further execute processing comprising:

acquiring behavior information indicating a result of a user's behavior;

transmitting the behavior information to the communication device after acquiring the behavior information; and acquiring the communication device position information from the communication device based on a timing at which the behavior information is transmitted to the communication device and updating the position information based on the communication device position information.

12. The behavior analysis system according to claim 11, wherein the processor is configured to further execute processing comprising:

acquiring a result of a behavior involving movement of the user, as the behavior information.

13. A behavior analysis method comprising:

communicating with a communication device configured to download a prediction ephemeris from an external device, and instructing the communication device to download the prediction ephemeris from the external device;

acquiring the prediction ephemeris from the communication device;

determining a current position using the prediction ephemeris acquired from the communication device and storing position information indicating the current position; and repeating, at intervals:
(i) acquiring, from the communication device, communication device position information indicating a position of the communication device;
(ii) updating the stored position information based on the communication device position information;
(iii) comparing the stored position information from before the updating with the acquired communication device position information, and determining whether a discrepancy between the stored position information from before the updating and the acquired communication device position information is larger than a predetermined threshold; and
(iv) making next and subsequent intervals at which the communication device position information is acquired shorter than a current interval in response to a determination that the discrepancy between the stored position information from before the updating and the acquired communication device position information is larger than a predetermined threshold.

14. The behavior analysis method according to claim 13, further comprising:

generating time information indicating a time; and repeating, at intervals, acquiring, from the communication device, communication device time information indicating a current time possessed by the communication device and updating the time information based on the communication device time information.

15. The behavior analysis method according to claim 14, further comprising:

acquiring behavior information indicating a result of a user's behavior;

transmitting the behavior information to the communication device after acquiring the behavior information; and acquiring the communication device time information from the communication device based on a timing at which the behavior information is transmitted to the communication device and updating the time information based on the communication device time information.

16. The behavior analysis method according to claim 15, further comprising:

acquiring a result of a behavior involving movement of the user, as the behavior information.

17. The behavior analysis method according to claim 13, further comprising:

acquiring behavior information indicating a result of a user's behavior;

transmitting the behavior information to the communication device after acquiring the behavior information; and acquiring the communication device position information from the communication device based on a timing at which the behavior information is transmitted to the communication device and updating the position information based on the communication device position information.

18. The behavior analysis method according to claim 17, further comprising:

acquiring a result of a behavior involving movement of the user, as the behavior information.

19. A non-transitory computer-readable storage medium storing a program causing a computer to execute functions that comprise:

communicating with a communication device configured to download a prediction ephemeris from an external device, and instructing the communication device to download the prediction ephemeris from the external device;

acquiring the prediction ephemeris from the communication device;

determining a current position using the prediction ephemeris acquired from the communication device and storing position information indicating the current position; and repeating, at intervals:
- (i) acquiring, from the communication device, communication device position information indicating a position of the communication device;
- (ii) updating stored the position information based on the communication device position information;
- (iii) comparing the stored position information from before the updating with the acquired communication device position information, and determining whether a discrepancy between the stored position information from before the updating and the acquired communication device position information is larger than a predetermined threshold; and
- (iv) reducing next and subsequent intervals at which the communication device position information is acquired by the information acquisition function shorter than a current interval in response to a determination that the discrepancy between the stored position information from before the updating and the acquired communication device position information is larger than a predetermined threshold.

* * * * *